United States Patent [19]

White et al.

[11] Patent Number: 5,814,373
[45] Date of Patent: Sep. 29, 1998

[54] HEAT-RESISTANT HYDROXY-FUNCTIONAL POLYETHERS AS THERMOPLASTIC BARRIER RESINS

[75] Inventors: Jerry E. White; H. Craig Silvis; Stephen E. Bales; Michael N. Mang; Muthiah N. Inbasekaran, all of Midland, Mich.

[73] Assignee: Dow Chemical Company, Midland, Mich.

[21] Appl. No.: 131,110

[22] Filed: Oct. 1, 1993

Related U.S. Application Data

[63] Continuation of Ser. No. 800,340, Nov. 26, 1991, abandoned.

[51] Int. Cl.[6] ............................................. B65B 55/00
[52] U.S. Cl. ................ 427/386; 428/34.3; 428/35.4; 428/36.6; 428/36.7; 528/96; 528/97; 426/415
[58] Field of Search .............................. 427/386; 428/34.3, 428/35.4, 36.6, 36.7; 528/96, 97; 426/415

[56] References Cited

U.S. PATENT DOCUMENTS

| | | | |
|---|---|---|---|
| 3,509,050 | 4/1970 | Korshak et al. | 252/12 |
| 3,538,042 | 11/1970 | Forster et al. | 523/466 |
| 3,960,795 | 6/1976 | Dowbenko et al. | 523/402 |
| 4,031,051 | 6/1977 | Dowbenko et al. | 528/100 |
| 4,707,534 | 11/1987 | Schultz | 528/97 |
| 4,786,668 | 11/1988 | Dewhirst | 523/445 |
| 4,786,669 | 11/1988 | Dewhirst | 523/445 |
| 4,882,370 | 11/1989 | Jordan et al. | 523/215 |
| 4,980,234 | 12/1990 | Almer et al. | 428/414 |
| 4,983,672 | 1/1991 | Almer et al. | 525/65 |
| 5,171,820 | 12/1992 | Mang et al. | 528/87 |
| 5,218,075 | 6/1993 | Brennan et al. | 528/99 |
| 5,275,853 | 1/1994 | Silvis et al. | 428/35.4 |

FOREIGN PATENT DOCUMENTS

| | | |
|---|---|---|
| 59091055 | 11/1982 | Japan . |
| 59093758 | 11/1982 | Japan . |
| 60260568 | 6/1984 | Japan . |
| 63012625 | 7/1986 | Japan . |
| 63012626 | 7/1986 | Japan . |
| 63218725 | 3/1987 | Japan . |
| 01240514 | 3/1988 | Japan . |
| 02073823 | 9/1988 | Japan . |
| 02117913 | 10/1988 | Japan . |
| 67244843 | 10/1958 | Netherlands . |
| 8904088 | 9/1986 | Rep. of Korea . |
| 208934 | 4/1965 | U.S.S.R. . |
| 226159 | 5/1967 | U.S.S.R. . |
| 231817 | 5/1967 | U.S.S.R. . |
| 1126571 | 1/1981 | U.S.S.R. . |

OTHER PUBLICATIONS

Chemical Abstracts 69:3488a (1968).
Chemical Abstracts 74:88405x (1971).
Chemical Abstracts 94:122452k (1981).
Chemical Abstracts 94:157746m (1981).
Chemical Abstracts 67:100457f (1967).
Chemical Abstracts 74:112689r (1971).
Chemical Abstracts 78:72824e (1973).
Chemical Abstracts 78:98202a (1973).
Chemical Abstracts 82:112283u (1975).
Chemical Abstracts 102:62599k (1985).
Chemical Abstracts 102:62642u (1985).
Chemical Abstracts 111:78704n (1989).

*Primary Examiner*—Frederick Krass

[57] ABSTRACT

Hydroxy-functional polyethers having a "cardo" diphenylene group in their backbones are prepared by contacting at least one dinucleophilic monomer with at least one diglycidyl ether of a cardo bisphenol, such as bis(hydroxyphenyl)fluorene, phenolphthalein, or phenolphthalimidine or a substituted cardo bisphenol, such as a substituted bis(hydroxyphenyl)fluorene, a substituted phenolphthalein or a substituted phenolphthalimidine, under conditions sufficient to cause the nucleophilic moieties of the dinucleophilic monomer to react with epoxy moieties to form a polymer backbone containing pendant hydroxy moieties and ether, imino, amino, sulfonamido or ester linkages. These polyethers possess a combination of high barrier to oxygen transmission (i.e., oxygen transmission rate less than 10.0 $cm^3$-mil/100 $in^2$-atm-day to oxygen) and high heat resistance (i.e., Tg above 120° C.). These polyethers are suitable for use in the manufacture of retort-sterilizable packaging materials exhibiting high barrier to oxygen.

3 Claims, No Drawings

HEAT-RESISTANT HYDROXY-FUNCTIONAL POLYETHERS AS THERMOPLASTIC BARRIER RESINS

CROSS-REFERENCE TO RELATED APPLICATION

This is a continuation of application Ser. No. 07/800,340, filed Nov. 26, 1991 now abandoned.

BACKGROUND OF THE INVENTION

This invention relates to thermoplastic polymers having pendant hydroxyl moieties and phenoxyether moieties and to articles prepared from such polymers.

Hydroxyphenoxyether polymers have good barrier to oxygen, having oxygen transmission rates (OTR) of less than 10 cm$^3$-mil/100 in$^2$-atm-day. These polymers are therefore useful in packaging oxygen-sensitive materials such as foodstuffs and medicines. See, for example, Reinking et al, J. Poly Sci., Vol. 7, pp. 2135–2144, pp. 2145–2152 and pp. 2153–2160 (1963) and Encyclopedia of Polymer Science and Technology, Vol. 10, pp. 111–122. However, these hydroxyphenoxyether polymers have only moderate heat resistance, typified by glass transition temperatures (Tg) below about 115° C. Attempts have been made to increase the heat resistance of these hydroxyphenoxyether polymers. However, hydroxyphenoxyether polymers modified to exhibit increased heat resistance and exhibit Tg above 115° C. generally suffer diminished barrier performance with OTR as high as 75 cm$^3$-mil/100 in$^2$-atm-day.

In view of the limited barrier properties and heat resistance of polymers having pendant hydroxyl moieties and phenoxyether moieties, it would be highly desirable to provide a polymer possessing a combination of genuinely good barrier (i.e., oxygen transmission rate less than 10.0 cm$^3$-mil/100 in$^2$-atm-day) and high heat resistance (i.e., Tg above 120° C.).

SUMMARY OF THE INVENTION

The present invention is, in one aspect, a polymer having a "cardo" diphenylene group in its backbone and pendant hydroxyl moieties and phenoxyether moieties.

In a second aspect, this invention is a retort-sterilizable packaging material fabricated of the above hydroxyphenoxy polymer. In yet a further aspect, this invention is a retort-sterilizable, substantially impermeable film or coating of the polymer.

In addition to their use as barrier containers and films, the polymers of this invention are also useful as molding, extrusion and casting resins.

DETAILED DESCRIPTION OF ILLUSTRATIVE EMBODIMENTS

As used herein, the term "cardo group" refers to the cyclic side group wherein at least one of the ring atoms is a part of the basic polymer chain. Preferred "cardo" groups are the fluorenediphenylene (FDP) group, the phenolphthalein (PPA) group, and the phenolphthalimidine (PPI) group having the following structures:

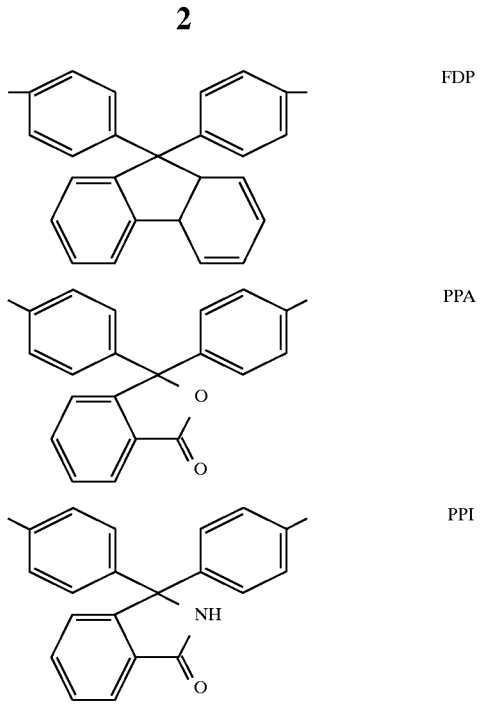

Preferably, the polymer of this invention has repeating units represented by the formula:

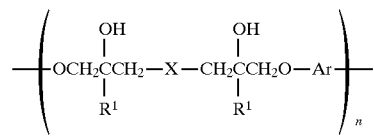

wherein n is an integer from 10 to 1000, X is an alkylimino, an arylimino, an arylenedioxy, an alkylenediamino, an arylenediamino, an arylenedisulfonamido or an arylenedicarboxy moiety; R$^1$ is independently hydrogen or a hydrocarbyl moiety; and Ar is represented by the formula:

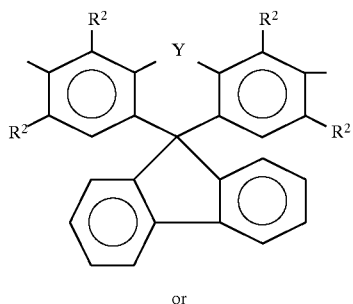

or

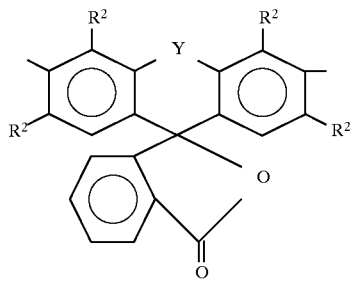

or

-continued

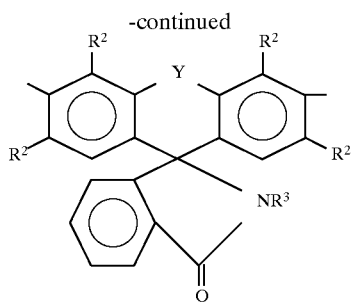

wherein Y is nil, a covalent bond, or a linking group wherein suitable linking groups include, for example, an oxygen atom, a sulfur atom, a carbonyl group, a sulfonyl group, or a methylene group; $R^2$ is independently hydrogen, halogen, a hydrocarbyl or substituted hydrocarbyl, wherein hydrocarbyl is a monovalent hydrocarbon such as alkyl, cycloalkyl, aralkyl, or aryl and the substituent(s) is a monovalent moiety which is inert in the reactions used to prepare the polymer; and $R^3$ is hydrogen, a hydrocarbyl or substituted hydrocarbyl wherein hydrocarbyl is as defined previously and the substituent(s) is also as defined previously. Examples of such substituents include hydroxy, cyano and halo moieties.

In the more preferred polymers, Y is nil, X is an arylenedioxy, an alkylimino, an arylimino, an alkylenediamino, an arylenediamino, an arylenedisulfonamido or an arylenedicarboxy moiety; each of $R^1$ and $R^2$ is independently hydrogen; and $R^3$ is hydrogen.

In the most preferred embodiment, X is a 4,4-isopropylidenebiphenylenedioxy, 4,4'-sulfonylbiphenylenedioxy, 4,4'-thiobiphenylenedioxy, 3,3'-dioxydiphenyl-N,N'-adipamide, N,N'-dimethyl-1,3-benzenedisulfamido, 2-hydroxyethylimino, 1,6-piperazino or 1,3-benzenedicarboxy moiety.

In general, the polymers of this invention are prepared by contacting at least one dinucleophilic monomer with at least one diglycidyl ether of a cardo bisphenol, such as 9,9-bis (4-hydroxyphenyl)fluorene, phenolphthalein, or phenolphthalimidine or a substituted cardo bisphenol, such as a substituted bis(hydroxyphenyl)fluorene, a substituted phenolphthalein or a substituted phenolphthalimidine under conditions sufficient to cause the nucleophilic moieties of the dinucleophilic monomer to react with epoxy moieties to form a polymer backbone containing pendant hydroxy moieties and ether, imino, amino, sulfonamido or ester linkages. Most preferred conditions are described hereinafter in the working examples.

Alternatively, the poly(hydroxy ethers) can be prepared by allowing a cardo bisphenol, such as bis(hydroxyphenyl) fluorene, phenolphthalein, and phenolphthalimidine or a substituted cardo bisphenol, such as a substituted bis (hydroxyphenyl)fluorene, a substituted phenolphthalein and a substituted phenolphthalimidine to react with the diglycidyl ethers of dihydric phenols. Copolymers may also be prepared with combinations of the dinucleophilic monomers and combinations of the diglycidyl ethers.

Suitable dinucleophilic monomers include dihydric phenols, dinucleophilic amines, arenedisulfonamides and aromatic diacids.

Examples of suitable dihydric phenols include but are not limited to 4,4'-isopropylidene bisphenol (bisphenol A), 4,4'-dihydroxy-diphenylethylmethane, 3,3'-dihydroxydiphenyldiethylmethane, 3,4'-dihydroxydiphenyl-methylpropylmethane, 4,4'-dihydroxydiphenyloxide, 4,4'-dihydroxydiphenylcyanomethane, 4,4'-dihydroxybenzophenone, 4,4'-dihydroxydiphenyl sulfide, 4,4'-dihydroxydiphenylsulfone, 2,6-dihydroxynaphthalene, 9,9-bis(4-hydroxyphenyl)fluorene, phenolphthalein, phenolphthalimidine and N-(2-hydroxyethyl)phenolphthalimidine. 4,4'-Isopropylidene bisphenol, 4,4'-dihydroxydiphenyl sulfide, 4,4'-dihydroxydiphenyl sulfone, 9,9-bis(4-hydroxyphenyl)fluorene, phenolphthalein and phenolphthalimidine are most preferred.

Examples of suitable dinucleophilic amines include but are not limited to ethylamine, propylamine, butylamine, ethanolamine, 2-propanolamine, 3-propanolamine, 2-carboxyamidoethylamine, benzylamine, aniline, p-anisidine, p-toluidine, 4-aminophenol, piperazine, 2,5-dimethylpiperazine, 2,5-diethylpiperazine, N, N'-dimethyl-1,4-diaminobenzene, N,N'-diethyl-1,4-diaminobenzene, N,N'-bis(2-hydroxyethyl)-diaminobenzene, bis(2-hydroxyethyl)-ethylenediamine and N,N'-dimethyl-2,6-diamino-naphthalene. Ethanolamine and piperazine are most preferred.

Suitable arenedisulfonamides include but are not limited to N,N'-dimethyl-1,2-benzenedisulfonamide, N,N'-dimethyl-1,3-benzenedisulfonamide, N, N'-dimethyl-1,4-benzenedisulfonamide, N,N'-bis(2-hydroxyethyl)-1,2-benzenedisulfonamide, N, N'-bis(2-hydroxyethyl)-1,3-benzenedisulfonamide, N, N'-bis(2-hydroxyethyl)-1,4-benzenedisulfonamide, N, N'-diphenyl-1,2-benzenedisulfonamide, N,N'-diphenyl-1,3-benzenedisulfonamide, N,N'-1,4-benzenedisulfonamide, N,N'-dimethyl-4,4'-biphenylenedisulfonamide, N,N'-dimethyl-4,4'-oxydiphenylenedisulfonamide, N,N'-dimethyl-4,4'-thiodiphenylenedisulfonamide, N,N'-dimethyl-4,4'-methylenediphenylenedisulfonamide, and N, N'-dimethyl-4,4'-sulfonyldiphenylenedisulfonamide.

Suitable aromatic diacids include but are not limited to isophthalic acid, terephthalic acid, biphenyl dicarboxylic acids, arenedioxydiacetic acids, and naphthalene dicarboxylic acids. Isophthalic acid is the most preferred.

Suitable diglycidyl ethers include but are not limited to the diglycidyl ethers of 9,9-bis(4-hydroxyphenyl)fluorene, 9,9-bis(3,5-dimethyl-4-hydroxyphenylfluorene)fluorene, 9,9'-bis(3,5-diethyl-4-hydroxyphenyl)fluorene, 9,9-bis(3,5-dibromo-4-hydroxyphenyl)fluorene, 9,9-bis(4-hydroxy-3,5-dichlorophenyl)fluorene, 9,9-bis(3-methyl-4-hydroxyphenyl)fluorene, 9,9-bis(3-phenyl-4-hydroxyphenyl)fluorene, 9,9-bis(3-chloro-4-hydroxyphenyl)fluorene, 9,9-bis(3,5-dicyano-4-hydroxyphenyl)fluorene, 9,9-bis(3-bromo-4-hydroxyphenyl)fluorene, 9,9-bis(3,5-diphenyl-4-hydroxyphenyl)fluorene, 9,9-bis(3-cyano-4-hydroxyphenyl) fluorene, 3,3-bis(4-hydroxyphenyl)phthalide (phenolphthalein), 3,3-bis(3,5-dimethyl-4-hydroxyphenyl) phthalide, 3,3-bis(3,5-dichloro-4-hydroxyphenyl)phthalide, 3,3-bis(3,5-dichloro-4-hydroxyphenyl)phthalide, 3,3-bis(3, 5-diphenyl-4-hydroxyphenyl)phthalide, 3,3-bis(3-methyl-4-hydroxy-phenyl)phthalide (cresolphthalein), 3,3-bis(3-bromo-4-hydroxyphenyl)phthalide, 3,3-bis(3-chloro-4-hydroxyphenyl)phthalide, 3,3-bis(3-cyano-4-hyroxyphenyl) phthalide, 3,3-bis(3,5-dicyano-4-hydroxyphenyl)phthalide, fluorescein, 3,3-bis(4-hydroxyphenyl)oxoisoindole (phenolphthalimidine), 3,3-bis(3,5-dimethyl-4-hydroxyphenyl)oxoisoindole, 3,3-bis(3,5-dichloro-4-hydroxyphenyl)oxoisoindole, 3,3-bis(3,5-dibromo-4-hydroxyphenyl)oxoisoindole, 3,3-bis-(3,5-diphenyl-4-hydroxyphenyl)oxoisoindole, 3,3-bis(3,5-dicyano-4-hydroxyphenyl)oxoisoindole, 3,3-bis(3-methyl-4-hydroxyphenyl)oxoisoindole, 3,3-bis(3-chloro-4 -hydroxyphenyl)oxoisoindole, 3,3-bis(3-bromo-4-hydroxyphenyl) oxoisoindole, 3,3-bis(3-phenyl-4-hydroxyphenyl)

oxoisoindole, 3,3-bis(3-cyano-4-hydroxyphenyl) oxoisoindole, 3,3-bis(4-hydroxyphenyl)-N-methyl (oxoisoindole, 3,3-bis(4-hydroxyphenyl)-N-ethyloxoisoindole, 3,3-bis(4-hydroxyphenyl)-N-phenyloxoisoindole, and 3,3-bis(4-hydroxyphenyl)-N-(2-hydroxyethyl)oxoisoindole [N-(2-hydroxethyl) phenolphthalimidine].

The diglycidyl ether of 9,9-bis(4-hydroxyphenyl)fluorene is prepared, in general, in two steps by procedures known in the art. See, for example, U.S. Pat. No. 4,882,370, the relevant portions of which are incorporated herein by reference. In step 1, the condensation of an unsubstituted or halogenated phenol with fluorenone or halogenated fluorenone yields a 9,9-bis(4-hydroxyphenyl)fluorene which, in step 2, is caused to react with an excess of epichlorohydrin to yield the diglycidyl ether of a 9,9-bis(4-hydroxyphenyl) fluorene.

In some cases, it is desirable to allow the dinucleophilic monomer to react with the diglycidyl ether in the presence of a catalyst. Preferred catalysts are quaternary ammonium and phosphonium salts, such as tetraethylammonium chloride, tetraethylammonium bromide, tetraethylammonium iodide, tetraethylammonium hydroxide, tetra(n-butyl) ammonium chloride, tetra(n-butyl)ammonium bromide, tetra(n-butyl)ammonium iodide, tetra(n-butyl)ammonium hydroxide, tetra(n-octyl)ammonium chloride, tetra(n-octyl) ammonium bromide, tetra(n-octyl)ammonium iodide, tetra (n-octyl)ammonium hydroxide, methyltris(n-octyl) ammonium chloride, ethyltriphenylphosphonium acetate, tetraphenylphosphonium bromide, tetraphenylphosphonium chloride, and tetraphenylphosphonium iodide. Most preferred catalysts include tetraethylammonium bromide, tetraethylammonium hydroxide, and ethyltriphenylphosphonium acetate.

In some instances it is desirable to allow the dinucleophilic monomer to react with the diglycidyl ether in the presence of suitable solvent. Preferred solvents include propylene glycol phenylether and dioxane. A suitable temperature range for the polymerization is 60° to about 200° C.

The retort-sterilizable articles, for example, containers, films and coatings, of this invention are fabricated from the polymers using conventional fabricating techniques for normally solid thermoplastics such as extrusion, coextrusion, compression molding, casting, blow molding, injection molding and similar fabrication techniques commonly employed to produce such articles.

It is well known that conventional heat-resistant, transparent thermoplastics are unsuitable for packaging air-sensitive materials. For example, polycarbonate, with a Tg of 150° C., has a very high oxygen transmission rate (OTR) of 300 cc-mil/100 in$^2$-day-atm. It is also well known that when structural units which decrease the packing density of the polymer chains are present, that the materials generally exhibit higher permeability to gases. For example, the copolyester of terephthalic acid and phenolphthalein has a Tg of 299° C., with a very high oxygen transmission rate of 500 cc-mil/100 in$^2$-day-atm. On the other hand, the polymers of the present invention exhibit a surprising and unusual combination of low permeability to oxygen, transparency and high glass transition temperatures, with OTR values for the polymers shown in Tables I and II varying from only 1.1 to 10.1 cc-mil/100 in$^2$-day-atm.

The following working examples are given to illustrate the invention and should not be construed as limiting its scope. Unless otherwise indicated, all parts and percentages are by weight.

EXAMPLE 1

Preparation of Poly(hydroxy ethers) (Polymers 1–5)

A mechanically stirred mixture of phenolphthalein (11.460 g, 36.0 mmol), the diglycidyl ether of bisphenol A (epoxy equivalent weight=171.1; 12.559, 36.7 mmol) and propylene glycol phenyl ether (17 mL) is heated to 120° C. under a nitrogen atmosphere. Ten drops of 70% ethyltriphenylphosphonium acetate in methanol is added, and the temperature of the reaction mixture rises exothermically to about 165° C. The resulting solution is allowed to cool to 150° C. and stirred at that temperature for 45 minutes, during which additional solvent (25 mL total) is added from time-to-time to maintain efficient stirring as the bulk viscosity of the solution increases. The solution then is diluted to 100 mL with dimethylformamide (DMF) and added to 1:1 methanol/water in a Waring Blendor to precipitate a white fibrous solid, which is stirred in fresh methanol/water for 24 hours. The product is collected by filtration, allowed to air dry, taken up in DMF (150 mL) and again precipitated from methanol/water to give polymer 1 as a white, fibrous powder [22.47 g, inherent viscosity (IV)=0.54 dL/g (DMF)] which is dried in vacuo at 120° C. for 24 hours and is hereinafter called Polymer 1.

Four additional poly(hydroxyethers), hereinafter called Polymers 2–5, respectively, are prepared using the foregoing procedure with the dihydric phenols corresponding to moieties shown for Ar' and the diglycidyl ethers corresponding to moieties shown for X in Table I. Phenolphthalimidine (Polymer 4) and N-(2-hydroxyethyl)phenolphthalimidine (Polymer 5) are prepared according to British Patent 1,158,606.

Polymers 1–5 are generally represented by the following formula:

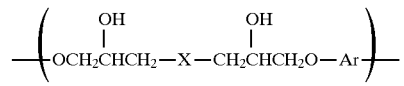

wherein X and Ar are as defined in Table 1.

EXAMPLE 2

Preparation of Poly(hydroxy ether) (Polymer 6)

A mechanically stirred mixture of 9,9-bis(4-hyroxyphenyl)fluorene (14.016 g, 40 mmol), the diglycidyl ether of bisphenol A (epoxy equivalent weight=173.4 13.849 g, 40.0 mmol) and propylene glycol phenyl ether (17 mL) is heated to 120° C. under a nitrogen atmosphere. 9,9'-bis(4-hyroxyphenyl)fluorene (FDP) is commercially available from Kennedy and Klim, Inc. A process for preparing FDP is disclosed in copending U.S. patent application Ser. No. 789,232 filed Nov. 7, 1991, now abandoned, which is incorporated herein by reference. Ten drops of 40% tetra-ethylammonium hydroxide in water are added, and the reaction temperature rises exothermically to 195° C. Additional solvent (5 mL) is added to initiate cooling. The resulting solution is allowed to cool to 165° C. and stirred at that temperature for one hour, during which additional solvent (25 mL total) is added to maintain efficient stirring as the bulk viscosity of the reaction solution increases. The solution is diluted to 100 mL with DMF and added to 1:1 methanol/water in a Waring Blendor to precipitate a white, fibrous solid. The product is taken up in tetrahydrofuran (THF, 100 mL) and again precipitated from methanol/water to give polymer 6 as a white fibrous powder [25.55 g, IV=0.50 dL/g (DMF)], which is dried in vacuo at 130° C. for 24 hours.

Four additional polyhydroxyethers, hereinafter called Polymers 7, 9, 10 and 11 are prepared using the same procedure with diglycidyl ethers corresponding to moieties shown for X in Table II.

Polymers 6, 7, and 9–11 are generally represented by the following formula:

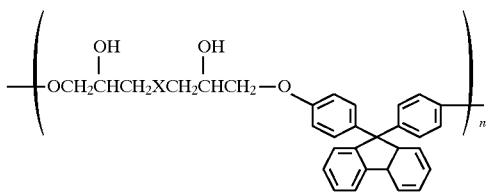

wherein X is as defined in Table II.

EXAMPLE 3

A. Preparation of N,N'-Bis(3-hydroxyphenyl) adipamide

A solution of adipoyl chloride (5.5 g, 0.03 mole) in dry THF, (50 mL) is added dropwise to a magnetically stirred solution of 3-aminophenol (13.0 g, 0.12 mole) in 150 mL of THF. A precipitate forms after 10–15 minutes and is collected by filtration and then washed with water and then with a mixture of water and tetrahydrofuran and recrystallized from an ethanol/water mixture. Analysis of the resulting 8.86 g of white solid indicates it to have the following structure:

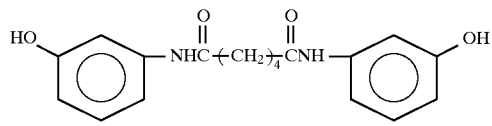

B. Preparation of the Diglycidyl Ether of Fluorenediphenol

A mechanically stirred solution of 9,9-bis(4-hydroxyphenyl)fluorene (105 g, 0.3 mol) and benzyltrimethylammonium chloride (0.23 g) in epichlorohydrin (600 mL) is stirred under a blanket of nitrogen at 80°–90° C. for 48 hours. The solution is then allowed to cool to room temperature and 50% aqueous sodium hydroxide (85 g) is added dropwise. The resulting mixture is allowed to stir for 15 hours and then poured into a stirred mixture of methylene chloride (1 L) and water (1 L). The organic layer is separated and dried with anhydrous magnesium sulfate. The methylene chloride along with residual epichlorohydrin is removed using a rotary evaporator, and the residual solid (155 g) is recrystallized from 2:1 ethanol/acetone (2.1 L) to give the diglycidyl ether of fluorenediphenyl (104 g) with an epoxy equivalent weight of 234.69 determined according to the method of Jay [Anal. Chem., 8, 3135 (1970)].

C. Preparation of Poly(hydroxy ether) (Polymer 8)

A mechanically stirred mixture of N,N'-bis(3-hydroxyphenyl)adipamide (11.821 g, 36.0 mmol), the diglycidyl ether of fluorenediphenol prepared as above (epoxy equivalent weight=234.69, 17.226 g, 36.7 mmol) and propylene glycol phenylether (17 mL) is heated to 120° C. under a nitrogen atmosphere. Ten drops of 70% ethyltriphenylphosphonium acetate in methanol is added, and the the temperature of the reaction mixture rises exothermically to about 165° C. The resulting solution is allowed to cool to 150° C. and stirred at that temperature for one hour, during which additional solvent (20 mL total) is added from time-to-time to maintain efficient stirring as the bulk viscosity of the solution increases. The products are isolated and purified as in Example 1 to give Polymer 8 as white fibrous powder [20.68 g, IV=0.47 dL/g (DMF)]. This polymer has the same formula as Polymer 6 wherein X is as defined in Table II.

EXAMPLE 4

Preparation of poly(hydroxy ether sulfonamide) (Polymer 12)

A mechanically stirred mixture of N,N'-dimethyl-1,3-benzenedisulfonamide [9.516 g, 36.0 mmol; prepared according to the procedure of Chattaway, J. Chem Soc., Vol 87, pp 145 (1905)], the diglycidyl ether of fluorenediphenol (epoxy equivalent weight=234.69, 16.898 g, 36.0 mmol) and propylene glycol phenyl ether (17 mL) is heated to 120° C. under a nitrogen atmosphere. Ten drops of 40% tetraethylammonium hydroxide in water are added, and the reaction temperature rises exothermically to 180° C. Additional solvent (5 mL) is added to initiate cooling. The resulting solution is allowed to cool to 160° C. and stirred at that temperature for 45 minutes, during which additional solvent (25 mL total) is added to maintain efficient stirring as the bulk viscosity of the reaction solution increases. The product is isolated and purified as in Example 2 to give polymer 12 as white fibrous powder [19.60 g, IV=0.64 dl/G (DMF)]. This polymer has the same formula as Polymer 6 wherein X is as defined in Table II.

EXAMPLE 5

Preparation of poly(hydroxy amino ether) (Polymer 13)

A mixture of ethanolamine (1.304 g, 21.4 mmol) and the diglycidyl ether of fluorenediphenol (epoxy equiv. wt.= 238.99, 10.203 g, 21.4 mmol) in dipropylene glycol methyl ether (10 mL) is heated to 150° C. (under nitrogen) and stirred at that temperature for 2 hours, during which additional solvent is added (10 mL total) to maintain efficient stirring. Diethanolamine (1 mL) is added, the solution is allowed to cool to 50° C., diluted to about 50 mL with DMF and added to vigorously stirred 5:1 water/methanol to precipitate the product. The product is dried in vacuo at 80° C. for 17 hours to give Polymer 13 as a white solid (10.6 g) with IV=0.41 dL/g.

Poly(hydroxy amino ether) 14 is prepared by the same procedure using piperazine and the diglycidyl ether of fluorenediphenol.

Polymers 13 and 14 have the same formula as Polymer 6 wherein X is as defined in Table II.

EXAMPLE 6

Preparation of poly(hydroxy ester ether) (Polymer 15)

A mixture of isophthalic acid (3.856 g, 23.2 mmol), the diglycidyl ether of fluorenediphenol (epoxy equiv. wt. 239.88 g/equiv., 11.142 g, 23.2 mmol) and tetra-n-butylammonium bromide (epoxy equiv. wt. 239.88 g/equiv., 11.14 2 g, 23.2 mmol, 4.00 g, 12.5 mmol) in dioxane (35 mL) is stirred at reflux under a blanket of nitrogen for 3.75 hours. Glacial acetic acid (1.5 mL) is added, and heating is continued for an additional hour. The resulting solution is then diluted to about 65 mL with DMF and added to vigorously stirred water (500 mL) to precipitate a solid which is washed with fresh water. The material is dried in vacuo at 95° C. for 24 hours, taken up in THF (65 mL) and again precipitated from water. After drying, the product (Polymer 15, 14.5 g) has IV=0.45 dL/g. This polymer has the same formula as Polymer 6 wherein X is as defined in Table II.

The data in the following Tables I and II show that the polymers of the present invention possess a good barrier (i.e., oxygen transmission rate less than 10.0 $cm^3$-mil/100 $in^2$-atm-day to oxygen) and high heat resistance (i.e., Tg above 120° C.).

TABLE I

| No | Ar | X | IV, dL/g[a] | Tg, °C. | OTR[b] |
|---|---|---|---|---|---|
| 1 | (diaryl with phthalide, O) | bisphenol-A type (CMe$_2$) | 0.54 | 145 | 3.5 |
| 2 | (diaryl with phthalide, O) | sulfone (SO$_2$) | 0.46 | 153 | 2.5 |
| 3 | (diaryl with phthalide, NH) | sulfide (S) | 0.50 | 123 | 2.7 |
| 4 | (diaryl with phthalide, NH) | bisphenol-A type (CMe$_2$) | 0.69 | 176 | 2.6 |
| 5 | (diaryl with phthalide, N–CH$_2$CH$_2$OH) | bisphenol-A type (CMe$_2$) | 0.42 | 121 | 1.9 |

[a]DMF, 0.5 g/dL, 25° C.
[b]Determined in units of cc-mil/100 $in^2$-atm-day for 5-mil, compression-molded samples at 60% relative humidity and at 23° C. according to ASTM method D-3985.

TABLE II

| No | X | IV, dL/g[a] | Tg, °C | OTR[b] |
|---|---|---|---|---|
| 6 | 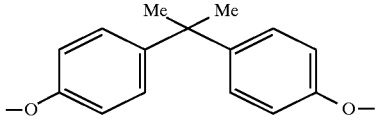 | 0.50 | 161 | 7.1–10.1 |
| 7 | 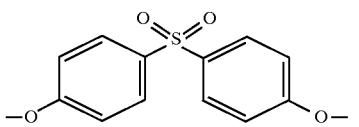 | 0.76 | 196 | 4.8 |
| 8 | —O—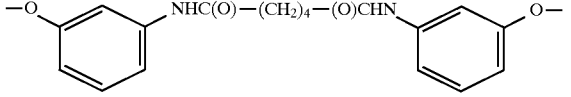—NHC(O)—(CH$_2$)$_4$—(O)CHN—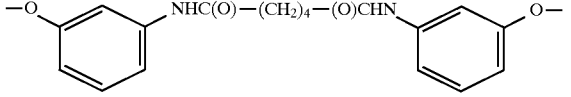—O— | 0.47 | 146 | 1.2 |
| 9 | 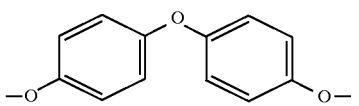 | 0.40 | 137 | 5.2 |
| 10 | 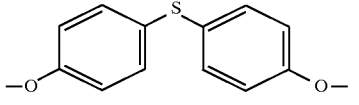 | 0.41 | 155 | 7.1 |
| 11 | 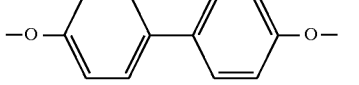 | 0.44 | 147 | 5.9 |
| 12 | —MeNO$_2$S—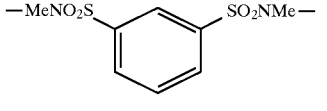—SO$_2$NMe— | 0.64 | 127 | 1.1 |
| 13 | 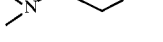 | 0.41 | 160 | 1.1 |
| 14 | —N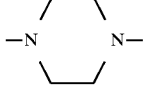N— | 0.67 | 179 | 2.3 |
| 15 | —O$_2$C—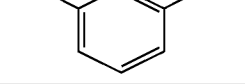—CO$_2$— | 0.45 | 138 | 3.6 |

[a]DMF, 0.5 g/dL, 25° C.
[b]Determined in units of cc-mil/100 in$^2$-atm-day for 5-mil, compression-molded samples at 60% relative humidity and at 23° C. according to ASTM method D-3985.

What is claimed is:

1. A method of packaging oxygen-sensitive materials which comprises placing the materials inside a barrier container or packaging film comprising a thermoplastic polymer having a glass transition temperature greater than 120° C., an oxygen transmission rate of less than 10.0 cm$^3$-mil/100 in$^2$-atm-day and repeating units represented by the formula:

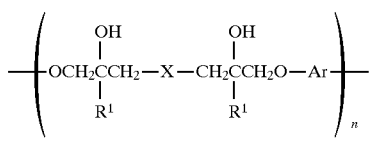

wherein Ar is a "cardo" diphenylene group represented by one of the formulas:

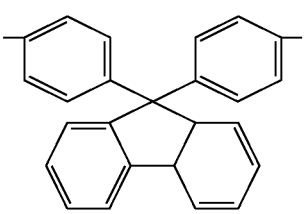

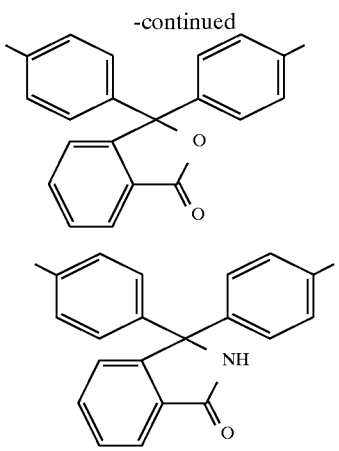

or

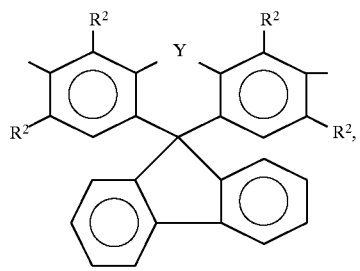

X is an alkylimino, an arylimino, an alkylenediamino, an arylenediamino, an arylenedisulfonamido, an arylenedicarboxy moiety or an arylenedioxy moiety wherein the arylene portion of said moiety may or may not be a "cardo" diphenylene group; R¹ is independently hydrogen or a hydrocarbyl moiety and n is an integer from 10 to 10,000.

2. A method of packaging oxygen-sensitive materials which comprises placing the materials inside a barrier container or packaging film comprising a thermoplastic polymer having a glass transition temperature greater than 120° C., an oxygen transmission rate of less than 10.0 cm³-mil/100 in²-atm-day and repeating units represented by the formula

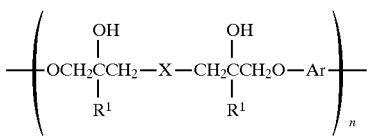

wherein R¹ is independently hydrogen or a hydrocarbyl moiety; Ar is a "cardo" diphenylene group represented by any one of the formula:

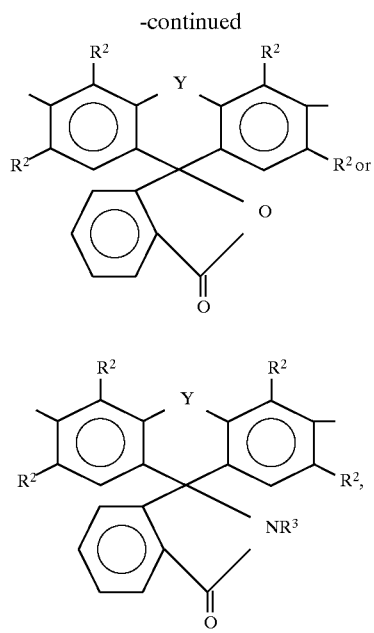

wherein Y is nil, a covalent bond or a linking group which is an oxygen atom, a sulfur atom, a carbonyl atom, a sulfonyl group, or a methylene group; R² is independently hydrogen, halogen, a hydrocarbyl or substituted hydrocarbyl, wherein hydrocarbyl is alkyl, cycloalkyl, aralkyl, or aryl and the substituent(s) is a monovalent moiety which is inert in the reactions used to prepare the polymer; and R³ is hydrogen, a hydrocarbyl or substituted hydrocarbyl, wherein hydrocarbyl is as defined previously and the substituent(s) is also as defined previously; and X is an alkylimino, an arylimino, an alkylenediamino, an arylenediamino, an arylenedisulfonamido, an arylenedicarboxy moiety or an arylenedioxy moiety, wherein the arylene portion of said moiety may or may not be a "cardo" diphenylene group, as defined previously; and n is an integer from 10 to 1000.

3. The method of claim 2 wherein Y is nil; X is an arylenedioxy, an alkylimino, an arylimino, an alkylenediamino, an arylenediamino, an arylenedisulfonamido or an arylenedicarboxy moiety; and R¹ and R² are hydrogen.

* * * * *

UNITED STATES PATENT AND TRADEMARK OFFICE
CERTIFICATE OF CORRECTION

PATENT NO. : 5,814,373
DATED : September 29, 1998
INVENTOR(S) : Jerry E. White; H. Craig Silvis; Stephen E. Bales; Michael N. Mang; Muthiah N. Inbasekaran It is certified that error appears in the above-identified patent and that said Letters Patent is hereby corrected as shown below:

Claim 1, column 13, line 24, "10,000" should correctly read -- 1,000 --

Signed and Sealed this

Eighth Day of February, 2000

Attest:

Attesting Officer

Q. TODD DICKINSON

Commissioner of Patents and Trademarks